G. WINTER & F. EICHBERG.
ALTERNATING CURRENT DYNAMO ELECTRIC APPARATUS.
APPLICATION FILED JUNE 11, 1902. RENEWED SEPT. 10, 1908.

1,016,866.

Patented Feb. 6, 1912.

4 SHEETS—SHEET 1.

Witnesses:

Inventors
Gabriel Winter
Friedrich Eichberg
By James L. Norris
Atty

G. WINTER & F. EICHBERG.
ALTERNATING CURRENT DYNAMO ELECTRIC APPARATUS.
APPLICATION FILED JUNE 11, 1902. RENEWED SEPT. 10, 1908.

1,016,866.

Patented Feb. 6, 1912.

4 SHEETS—SHEET 2.

Witnesses:

Inventors,
Gabriel Winter,
Friedrich Eichberg.
by James L. Norris
Att'y.

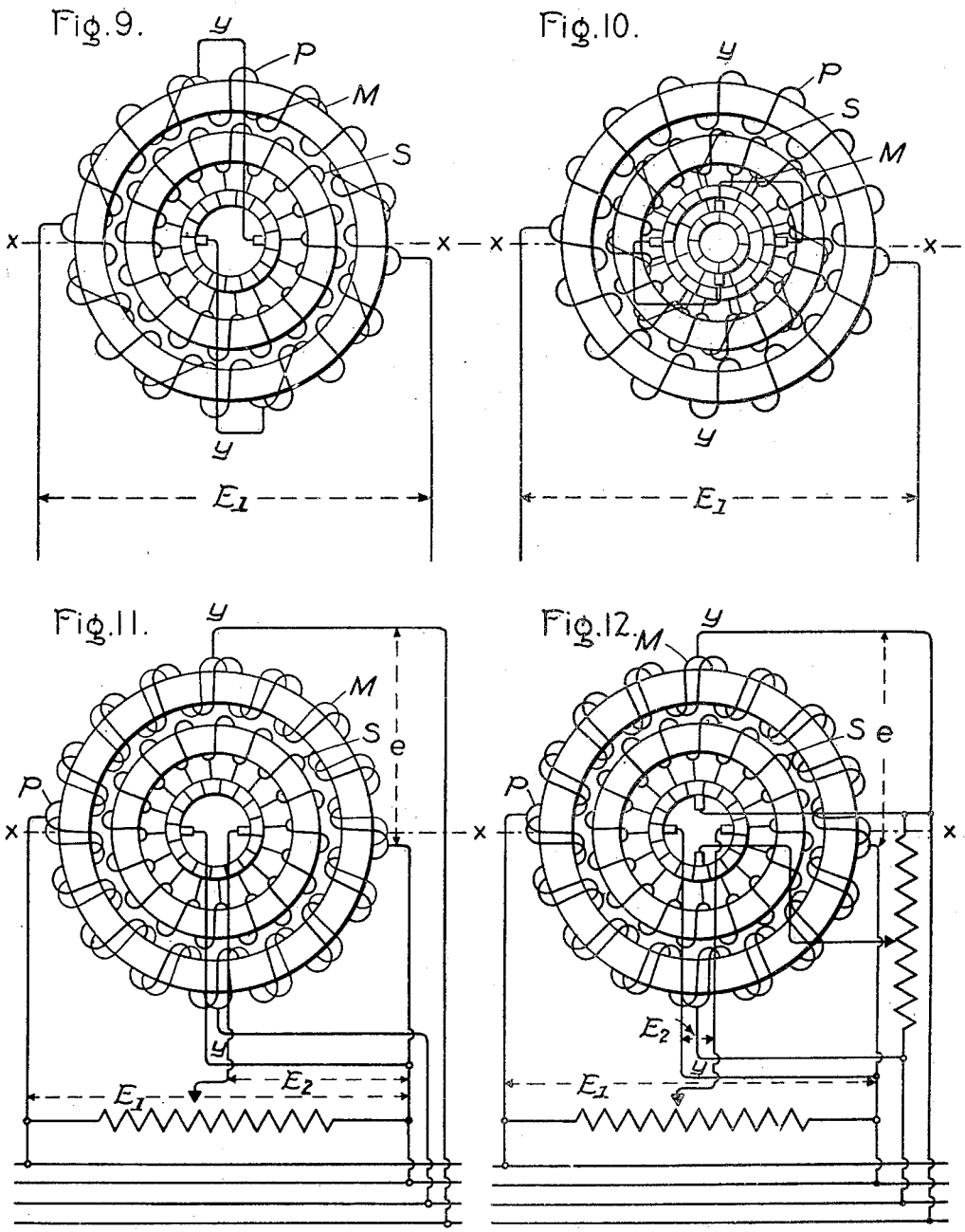

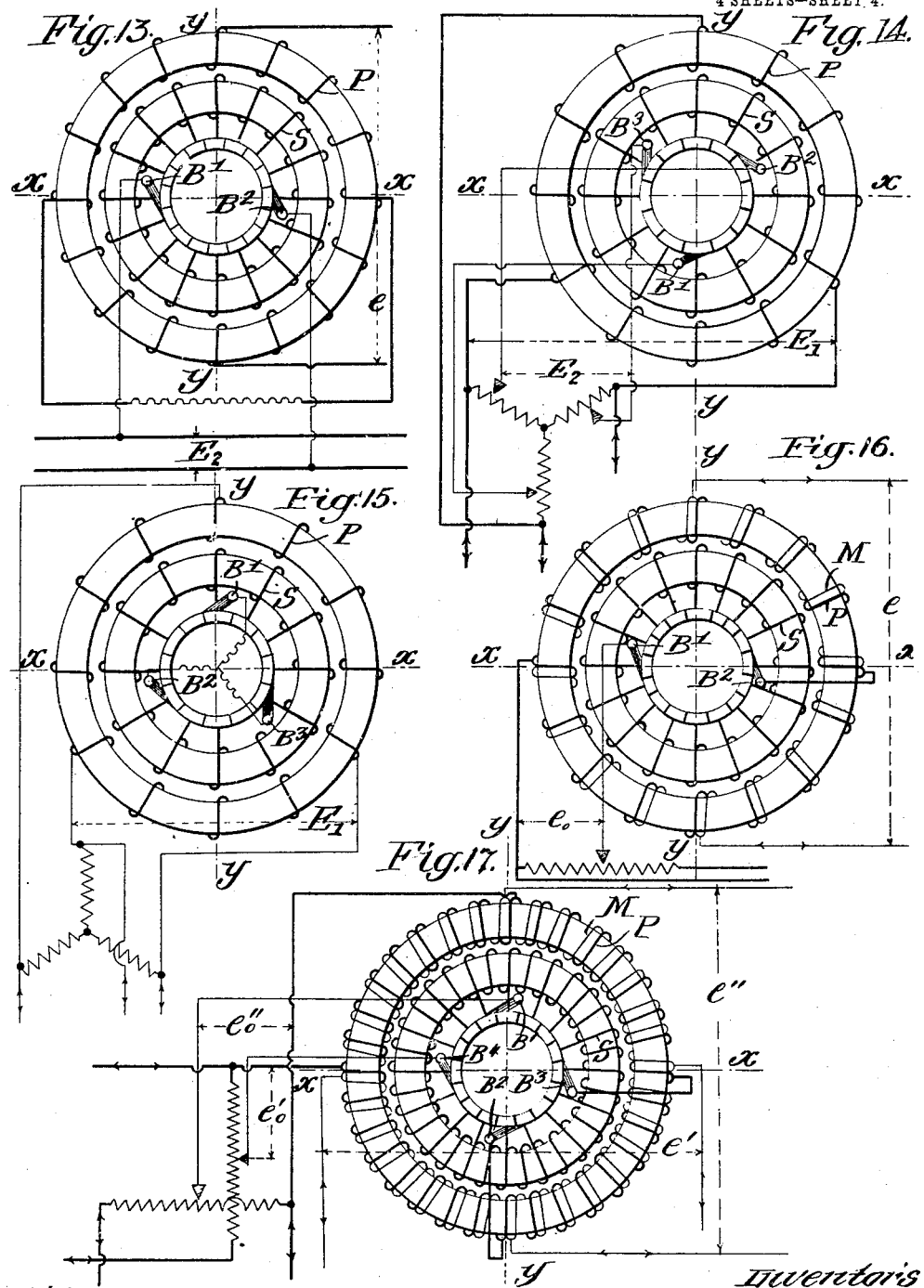

UNITED STATES PATENT OFFICE.

GABRIEL WINTER AND FRIEDRICH EICHBERG, OF VIENNA, AUSTRIA-HUNGARY, ASSIGNORS TO GENERAL ELECTRIC COMPANY, A CORPORATION OF NEW YORK.

ALTERNATING-CURRENT DYNAMO-ELECTRIC APPARATUS.

1,016,866.  Specification of Letters Patent.  Patented Feb. 6, 1912.

Application filed June 11, 1902, Serial No. 111,180. Renewed September 10, 1908. Serial No. 452,450.

*To all whom it may concern:*

Be it known that we, GABRIEL WINTER and FRIEDRICH EICHBERG, subjects of the Emperor of Austria-Hungary, residing at Vienna, Austria-Hungary, have invented certain new and useful Improvements in Alternating-Current Dynamo-Electric Apparatus, of which the following is a specification.

Our invention relates to alternating current machines of the commutator type, and comprises certain novel arrangements of the windings and circuit connections of such machines, and also certain novel arrangements for controlling the operation of such machines whereby the speed and torque of motors, and the voltage or the periodicity (or both) of generators may be varied at will.

Our invention will best be understood by reference to the accompanying drawings, in which—

Figure 1:
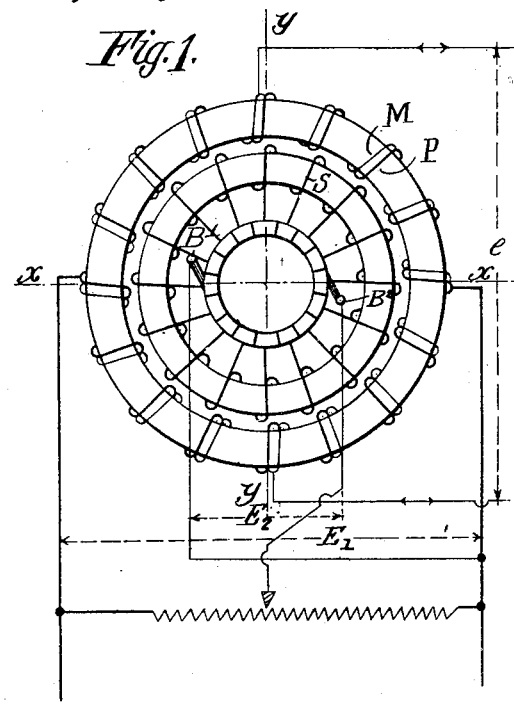
Figure 2:
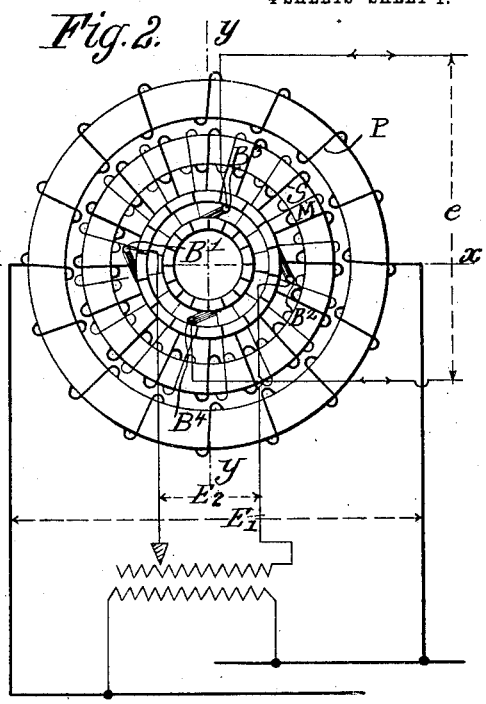
Figure 3:
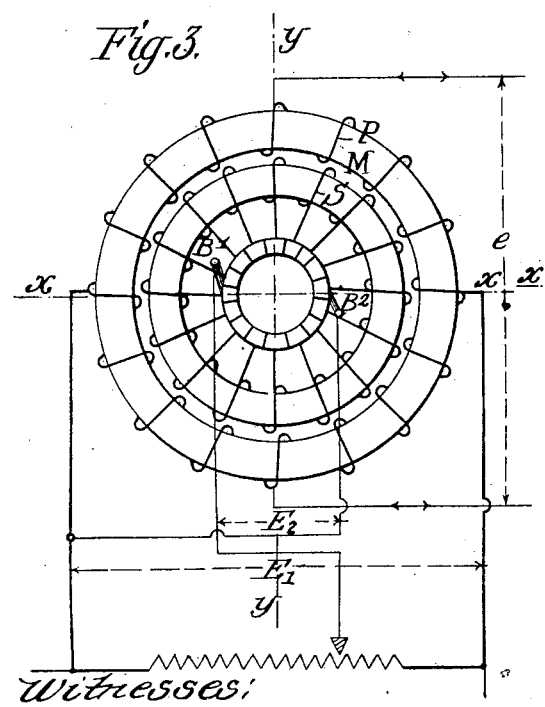
Figure 4:
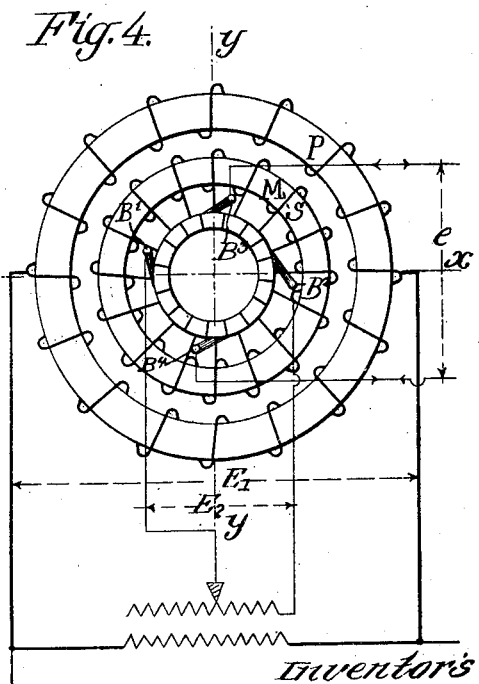
Figure 5:
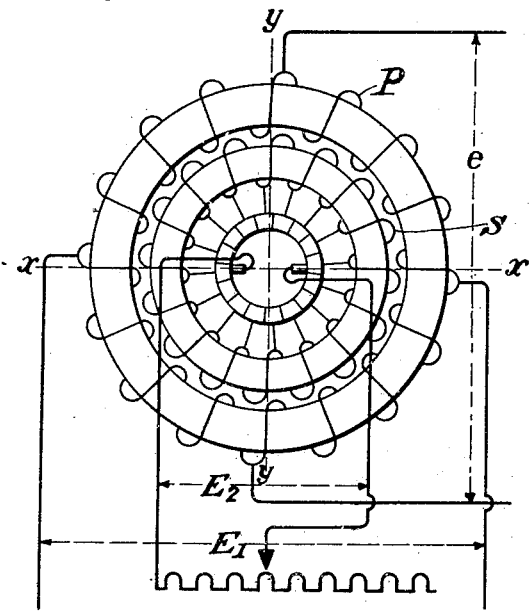
Figure 6:
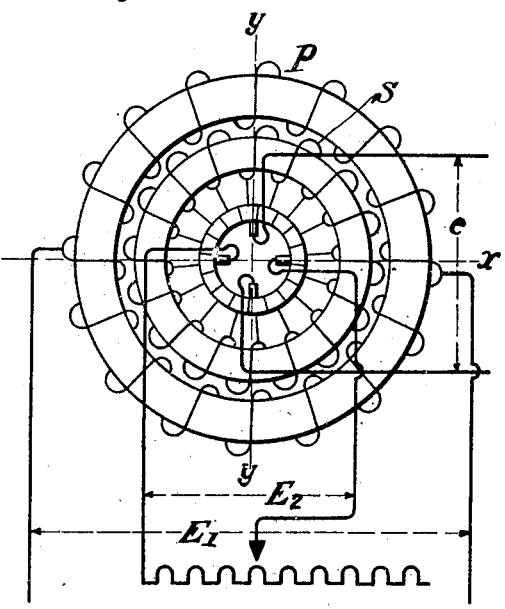
Figure 7:
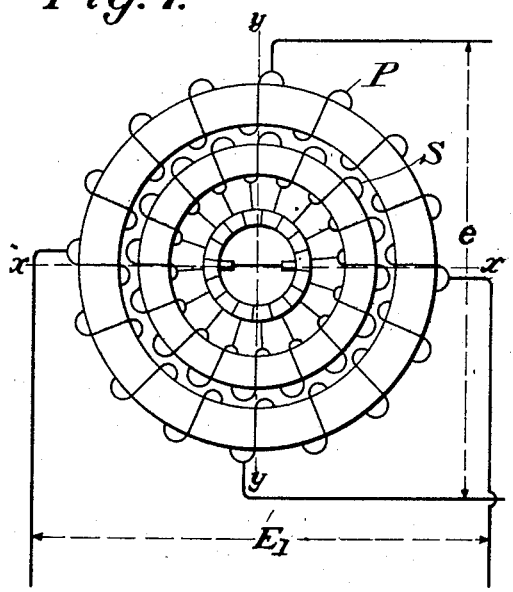
Figure 8:
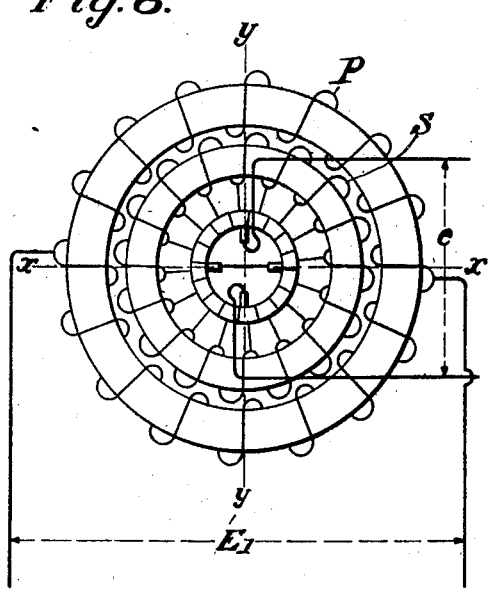

Figure 1 shows diagrammatically a machine having one of the arrangements of windings and circuit connections comprised within our present invention, in which arrangement the stator of the machine is provided with a primary winding and with a magnetizing winding, and the rotor is connected with a source of counter-electromotive force by means of a commutator and brushes; Fig. 2 shows another arrangement, in which the magnetizing winding is transferred to the rotating member; Figs. 3 and 4 show further arrangements, in which the magnetizing winding is combined with the working windings of the stator and rotor respectively; Figs. 5 and 6 show arrangements in which a variable impedance is substituted for a variable counter-electromotive force; Figs. 7 and 8 show modifications in which the impedance is omitted and the winding directly short-circuited; Figs. 9 and 10 show arrangements in which the magnetizing winding is in series with the secondary member; Fig. 11 shows an arrangement in which the working and magnetizing currents are obtained respectively from the two phases of a two-phase system; Fig. 12 shows an arrangement in which both working and magnetizing currents are obtained from both of the two phases; Fig. 13 shows an arrangement in which the winding on the stationary member is short-circuited and current supplied to the rotating member; Figs. 14 and 15 show arrangements in which the working and magnetizing currents are obtained from the three phases of a three-phase system; Fig. 16 shows an arrangement in which the working windings on the two members are connected in series; and Fig. 17 shows a modified arrangement having two sets of connections, one for each phase of a two-phase circuit.

If voltages of the same phase are impressed on the primary and secondary windings (hereinafter referred to as P and S, respectively) of an alternating current transformer, then, when the ratio of these voltages corresponds to the ratio of transformation of P and S, the current flowing in each of the windings will produce one-half of the magnetic field of the transformer, *i. e.*, when the ratio of transformation is one, each winding takes one half the magnetizing current, or, generally stated each winding gives one half the total magnetizing ampere turns—while the electromotive forces (E. M. F.'s) induced thereby in the windings will bear to each other a ratio corresponding to the ratio of transformation and will be opposed to the respective impressed voltages; but when the windings P and S are connected to voltages of a ratio different from the ratio of transformation, the winding P will take from the source a larger current, for example, while S will then return current to the source, since in this example the voltage induced in P is less than the voltage impressed thereon, and since the voltage induced in S is greater than the voltage impressed thereon. The difference between the energies corresponding to these two currents is the total energy loss of the transformer, including ohmic and iron losses.

We take advantage of the above transformer action in one of our arrangements for motor-control as follows: Let the primary and secondary winding system be arranged in the manner illustrated in Fig. 1 of the accompanying diagrammatic drawings—i. e., as separate bipolar ring windings disposed in such a way that S can move independently of P, while the points of connection to the source and therefore the magnetic poles of S are maintained on the line $x\,x$, which can be easily attained by providing the winding S with a segmental commutator and causing the current to be supplied through brushes situated on line $x\,x$. If now there be added to the windings P and S a winding M so arranged that the current in it produces a magnetic field having the axis $y\,y$ at right angles to the axis of the field of the windings P and S, and if the current supplied to the winding M corresponds as nearly as possible in phase to the currents in P and S; then a torque is produced which is proportional to the field of winding of M, to the ampere turns of the rotor S and to the cosine of the displacement of phase between both of these last magnitudes. The counter E. M. F. occurring at the commutator upon rotation of the rotor in the field having the axis $y\,y$ has its greatest effective value on the line $x,x,$ and is in phase with the magnetic field having the axis $y\,y$.

If the phase angle between the E. M. F. connected to S (this E. M. F. being hereinafter referred to as $E_2$) and the magnetic field of M is very small and the influence of the magnetic leakage and ohmic loss is disregarded, then the counter E. M. F. due to rotation, which is in phase with the magnetic field of M, is consequently nearly the same or opposite direction to that of the E. M. F. connected to the rotor and is also nearly in the same or opposite direction to the electromotive force generated in the rotor by the primary field on the axis $x\,x$, since this latter electromotive force is substantially in phase with the electromotive force $E_2$ impressed on the secondary.

With increasing speed the counter-electromotive force due to rotation increases, and consequently the resultant electromotive force upon winding S decreases when the counter electromotive force is opposed to the electromotive force connected to the rotor.

Any desired speed within practicable limits can be provided for by supplying to said windings voltages of relatively varying magnitudes, that is, by making variations in the difference between the potential (hereinafter called $E_1$) supplied to the stator winding P, and the potential $E_2$ supplied to the rotor winding S. If the fall or loss in potential in the windings were not taken into account and the number of windings P and S are assumed equal, then it could be said that the speed which the rotor acquires is proportional to the difference $E_1-E_2$ when the magnetic field having its axis on the line $y\,y$ is of constant strength. That is, when $E_1=E_2$ the motor stands still. If $E_1$ is greater than $E_2$, the motor speeds up until the counter-electromotive force, due to rotation, equals $E_1-E_2$. If $E_2=0$, the motor speeds up until the counter-electromotive force equals $E_1$. This is the condition with winding S directly short-circuited. In this case, if the field of winding M equals the field of winding P, the motor runs synchronously. On this principle may be provided a starting and controlling system whereby for example the stator is subjected to a nearly constant voltage while the rotor has impressed upon it a voltage of less ratio to the voltage of the stator than the ratio of windings, the difference of the quotients of the impressed voltage and the number of turns of stator and rotor respectively being in accordance with the speed required. The speed is also dependent upon the strength and phase of the magnetic field produced by the winding M and consequently, by variation of these magnitudes, a regulation can also be produced. With the same object in view the rotor potential can be maintained constant and the stator potential varied.

If the rotor is turning and is then subjected to a potential corresponding to a higher number of revolutions then it advances to the higher speed but if on the other hand it is subjected to a potential which corresponds to a lower number of revolutions, then it acts as a brake and, as a dynamo, gives energy back to its circuit until its speed is sufficiently reduced. When a means of driving is provided such machines may be caused to act permanently as dynamos and they can then be connected in parallel as easily as ordinary continuous current dynamos.

In the example shown in Fig. 1 the winding M is located on the stationary part, and is excited from an external source. The winding P is subjected to the full potential $E_1$, and the winding S to the suitably reduced potential $E_2$ supplied through brushes $B^1\,B^2$ and the segmental commutator. The regulation of the speed is effected chiefly by altering the E. M. F. supplied to the winding S, but such regulation may also be effected by varying the current in the winding M.

In the example shown in Fig. 2 the winding M is located upon the rotor and is provided in this case with a segmental commutator such that the axis of the field may remain on the line $y\,y$ irrespective of the movement of the rotor. In this, as in the first example, the winding P is subjected to the full potential $E_1$ and the winding S to the variable potential $E_2$ and they convey the working current properly so-called, while current in the winding M supplies substantially the excitation only. The magnetic field which is produced by current flowing in the winding M (and which must be kept as much as possible in phase with the working currents) is produced in Figs. 1 and 2 by separate excitation.

As the points of connection for the currents in the windings P and S lie on one axis $x$ $x$ at right angles to the axis $y$ $y$ of the points of connection of the winding M, it will be seen that, the former being equipotential to the latter points of connection, the winding M can be dispensed with and its functions usurped by one of the two windings P or S. In this way the simplified arrangements shown in Figs. 3 and 4 are obtained. In that shown in Fig. 3 M is combined with P, and in that shown in Fig. 4 M is combined with S.

Instead of connecting the rotor with the secondary winding of a transformer divided into potential graduations, as is shown in Figs. 1 to 4, it may be connected with or to an impedance which utilizes resistance, inductance or capacity, the torque being determined by the adjustment of the impedance. Such an arrangement is shown in Figs. 5 and 6 where the winding S is closed through a variable impedance. If the impedance is made very small—i. e., should the terminals be short-circuited, then $E_2=0$, P is subjected to $E_1$ as before, and current flowing through M again provides the excitation either by the stator or the rotor. Figs. 7 and 8 show arrangements in which winding S is directly short-circuited. On the other hand, however, P can be used in conjunction with an impedance or can be short circuited, as shown in Fig. 13, in which latter case $E_1=0$, S on the contrary being subjected to $E_2$.

In most of the arrangements described heretofore it is evident that the field produced on the line $x$ $x$ by the currents in windings P and S, which is the field that produces the counter-electromotive force in winding P and the secondary induced electromotive force in winding S, is 90 degrees out of phase with the voltage impressed on winding P. The field produced on the line $y$ $y$, however, has been assumed to be approximately in phase with the currents in windings P and S. Therefore, it will be seen that the two fields tend to produce a rotary field which is more or less uniform, according as the two component fields vary in relative strength and the phase of the currents in windings P and S varies relatively to the voltage impressed on winding P. It is not necessary, however, that the two components of this rotary field should be produced by currents coming from external sources of voltages of different phases. The magnetic field M may be excited by current coming from the brushes, and in that case a field winding system of few turns would be used in order to permit the use of a low voltage at the commutator, instead of a system of many turns, such as would be suitable when field M is excited from the external source of comparatively high voltage. Figs. 9 and 10 show such arrangements. In these figures the winding M is connected in series with winding S. With this arrangement the field of M must obviously be always in phase with the rotor currents.

The stator has hereinbefore been assumed to have been provided with a winding or windings in which the two currents may be supplied by electromotive forces differing in phase, while the currents in the two windings lag behind their impressed electromotive forces by different amounts, since the current of one phase M supplies chiefly the excitation while current of the other phase (the axis of whose field is identical with the commutation line on the rotor) is the working current. Thus as shown in Fig. 11, winding P may be excited from one phase of a two-phase system, the current in the winding being practically in phase with the impressed voltage, while the winding M may be excited from the other phase, the current in the winding lagging nearly 90 degrees behind the impressed voltage, the currents in the two windings being consequently practically in phase with each other. This arrangement can be rendered more universally applicable by providing the stator with windings adapted for use with currents of as many phases as may be desired, of which one is the working current proper while the others produce chiefly the necessary magnetization. The rotary field of the stator acts upon the oscillating working field of the rotor. If polyphase alternating currents are conveyed to the rotor then the rotary field of the stator acts upon all the phases of the rotor. In this case currents of all phases in the stator produce work. Thus in the arrangement shown in Fig. 12, two-phase currents are supplied to both stator and rotor, each phase supplying the magnetizing current to coact with the working currents supplied by the other phase. It will be seen that the rotor brushes bear on those parts of the commutator which are connected to the rotor conductors which are at any given instant adjacent to the stator conductors connected to the leads from the source. In a similar manner to that obtained in a previously described example variation of speed can be obtained by producing an increase or decrease of the difference between the voltages impressed upon the stator and upon the rotor, and in order that this may be effected it is by no means necessary that the transformation ratio be P:S=1; on the contrary, the ratio may have any desired value. Provision is made for exerting a torque while the motor remains in position of rest (for example when the motor is stopped on an ascending grade) by impressing a voltage per turn of winding which is approximately equal in the primary and the secondary; and the speed is controlled by varying the voltage per turn of winding impressed on S. It is however not necessary that P and S be polyphase windings having equal number of phases but on the contrary, P may have a number of phases different from that of S.

Fig. 14 illustrates an example in which P and S are each connected to a three-phase system. In this arrangement the phases II and III supply the magnetic field for phase I, phases I and II the excitation for phase III and phases I and III that for phase II. As in the case of single-phase arrangements, impedances may be used instead of counter-electromotive force. Fig. 15 shows a modified arrangement in which S is closed only by impedances.

An arrangement is also possible wherein P and S, as in Fig. 16, are connected in such a way that the currents sent through them in series produce an equal sum of ampere turns in each. In some of the previously described arrangements the full voltages were impressed on P and S at the start of rotation, but the difference between these voltages was a minimum, while in this case with P and S in series, the voltage $e_0$ is at the minimum at the start of rotation and increases with the speed. The working currents again coöperate with the magnetic field of M and by varying the potential $e_0$ and the strength and phase of this magnetic field the speed of the rotor can be varied. It is furthermore possible to excite the magnetic field M by the current coming from the brushes instead of deriving it from an external source as has heretofore been illustrated and explained.

The series connections hereinbefore described specially for the case in which the rotating armature has brushes on one axis as shown in Fig. 16, can also be employed in a simple manner for a polyphase system (see Fig. 17) by using polyphase windings instead of single phase windings, like phases of the two windings being connected in series, viz., all of each set of conductors of the stator are in series or parallel or in parallel series, all of each set of conductors of the rotor are connected in the same manner and both these systems connected in series. In this case the magnetic rotary field must be produced by a separate polyphase current conductor M, the number of phases supplied to this magnetizing system however being quite independent of the number of phases supplied to the other windings.

An important condition to be observed is that the magnetic field, which is produced by the exciting currents should be approximately at right angles to the rotary field which would be produced by the currents flowing through the primary and secondary windings if they exist separately. In the arrangement shown in Fig. 17 the potentials $e'_0$ and $e''_0$ impressed upon the two phases of the working windings each take the place, for its phase, of the potential $e_0$ of Fig. 16. Now, by adjusting these potentials $e'_0$ and $e''_0$ applied to the working windings connected in series and the intensity of the magnetic field determined by the potentials $e'$ and $e''$, any desired speed of rotation can be provided for any load.

Not only the arrangement of apparatus illustrated in Fig. 1 but also the other apparatus hereinbefore described, can be used as generators because upon excitation through a determined magnetic field an E. M. F. of the same phase and periodicity is generated in the rotor quite independently of the speed.

All the figures relate to a bi-polar arrangement and only represent examples of construction. For an apparatus having a greater number of poles the magnetic field axes $x$—$x$ and $y$—$y$ are generally inclined to one another at an angle of 90° divided by half the number of poles.

The windings on the stator are herein shown as ring windings, but it must be understood that all known and suitable open or closed phase windings, that is to say the winding systems for any special phase, can be used. The windings on the rotor are also shown as ring or Gramme windings, but all suitable closed windings, such as are used for continuous currents and with segmental commutators can be used.

We do not claim specifically in this case the arrangement in which the magnetizing current is supplied through a commutator and brushes, since this arrangement forms the subject-matter of a divisional application, Serial No. 329,022, filed August 3, 1906.

Claims:

1. In combination, an alternating current machine supplied with a commutator and brushes, windings on both members of said machine adapted to magnetize said machine in a fixed direction, means for supplying to said windings voltages of relatively varying magnitudes, and means for magnetizing said machine in a second direction at an angle to the first direction.

2. In combination, an alternating current machine supplied with a commutator and brushes, windings on both members adapted to produce jointly a single alternating field, means for supplying to said windings voltages varying in relative magnitude, and means for producing a second alternating field at an angle to the first.

3. In combination, an alternating current machine supplied with a commutator and brushes, means for supplying to adjacent points on both members of said machine voltages of relatively varying magnitude, and means for supplying at other points of one of the members currents in phase with the currents produced by the first named voltages.

4. In combination, an alternating current machine, windings on the stator of said machine adapted for polyphase currents, leads from a source of polyphase voltages to said windings, windings on the rotor of said machine supplied with a commutator, brushes bearing on the commutator, and means for supplying to said brushes voltages variable in magnitude relative to the voltages of said leads.

5. In combination, an alternating current machine supplied with a commutator and brushes, means for producing in one member an alternating magnetic field, means for supplying to that part of the winding of the other member under the influence of said field a variable voltage opposing the voltage induced in said winding by said field, and means for producing a second field at an angle to the first.

6. In combination, an alternating current machine supplied with a commutator and brushes, means for producing in said machine an alternating magnetic field, means for impressing on one member a variable voltage opposing the electromotive force induced by said field, and means for producing a second field at an angle to the first named field and in phase with the currents induced by said first named field.

7. In combination, an alternating current machine, a polyphase winding on the stator of said machine, means for supplying polyphase voltages to said winding, a winding on the rotor of said machine supplied with a commutator, brushes bearing on said commutator, and means for impressing on said brushes a variable voltage opposing in phase the voltage induced at said brushes by the currents in said stator winding.

8. In combination, an alternating current machine supplied with a commutator and brushes, a polyphase winding on the stator of said machine, means for supplying polyphase voltages to said winding, a winding on the rotor of said machine supplied with a commutator, and means for supplying to said rotor winding variable voltages opposing the electromotive forces induced in said rotor winding by the currents in the different phases of the stator winding.

9. In combination, an alternating current machine having a stator winding and a rotor winding provided with a commutator and brushes bearing on said commutator on the line of magnetization of the stator winding, a transformer connected in shunt to the stator winding, means for connecting said brushes to variable portions of the transformer winding, and means for magnetizing said machine along a second line at an angle to the first mentioned magnetization.

10. In combination, an alternating current machine having a stator winding and a rotor winding provided with a commutator and brushes bearing on said commutator on the line of magnetization of the stator winding, a transformer connected in shunt to the stator winding, means for connecting said brushes to variable portions of the transformer winding, and means for producing a magnetization of the machine along a second line at an angle to the first named magnetization and in phase with the rotor currents.

11. An alternating current machine of the commutator type, having means for producing in one member an alternating magnetic field, means for supplying to that part of the winding of the other member under the influence of said field a variable voltage, and means for producing a second field at an angle to the first.

12. An alternating current machine of the commutator type, having means for producing in one member an alternating magnetic field, means for impressing on the other member a variable voltage, and means for producing a second field at an angle to the first named field and in phase with the currents induced by said first named field.

13. In combination, an alternating current machine, a polyphase winding on the stator of said machine, means for supplying polyphase voltages to said winding, a winding on the rotor of said machine supplied with a commutator, brushes bearing on said commutator, and means for impressing a variable voltage on said brushes.

14. An alternating current machine of the commutator type, having a polyphase winding on the stator of said machine, means for supplying polyphase voltages to said winding, a winding on the rotor of said machine supplied with a commutator, and means for supplying variable voltages to said rotor winding.

15. In combination, an alternating current machine supplied with a commutator and brushes, means for producing in said motor an alternating magnetic field, means for impressing on one member a variable voltage opposing the electromotive force induced by said field, and means for producing a second field at an angle to the first.

In testimony whereof we have hereunto set our hands in presence of two subscribing witnesses.

GABRIEL WINTER.
FRIEDRICH EICHBERG.

Witnesses:
JOSEF RUBASCH,
ALVESTO S. HOGUE.